United States Patent [19]

Bartel et al.

[11] 4,330,096
[45] May 18, 1982

[54] APPARATUS FOR WINDING OR UNWINDING WEBS OF PHOTOSENSITIVE MATERIAL OR THE LIKE

[75] Inventors: Siegfried Bartel, Gauting; Bernd Payrhammer, Munich; Erich Nagel, Anzing, all of Fed. Rep. of Germany

[73] Assignee: AGFA-Gevaert Aktiengesellschaft, Leverkusen, Fed. Rep. of Germany

[21] Appl. No.: 192,906

[22] Filed: Oct. 1, 1980

[30] Foreign Application Priority Data

Oct. 27, 1979 [DE] Fed. Rep. of Germany ....... 2943488

[51] Int. Cl.³ .............................................. B65H 75/28
[52] U.S. Cl. ................................................... 242/74.1
[58] Field of Search .......................... 242/74.1, 74.2, 74, 242/67.1 R, 76, 71.1, 195; 354/157, 158

[56] References Cited

U.S. PATENT DOCUMENTS

3,586,258 6/1971 Horlezeder ...................... 242/71.1
3,606,192 9/1971 Goddard .............................. 242/74
3,712,558 1/1973 Johnson ............................. 242/195
4,218,032 8/1980 Nagel ................................... 242/74

Primary Examiner—Edward J. McCarthy
Attorney, Agent, or Firm—Kontler & Grimes

[57] ABSTRACT

Apparatus for winding webs of photographic film like onto the hub of a reel in a cassette has a flexible band one end of which is secured to the hub and the other end of which is connected to a coupling unit having a normally closed clamping mechanism for the leader of a web. The leader can be threaded through an inlet opening of the cassette and into the coupling unit when the clamping mechanism is held in open position by a permanent magnet which is installed in the cassette adjacent to the opening. When the hub is rotated in a direction to convolute the band and thereupon the web therearound, the coupling unit is withdrawn from the field to the permanent magnet and is confined in a peripheral recess of the reel. If the web is thereupon unwound, the coupling unit is withdrawn from the recess and is advanced toward the opening so that the magnet opens the clamping mechanism and the latter permits withdrawal of the leader of the web therefrom. The clamping mechanism thereupon remains open until an operator inserts the leader of a fresh web and causes the hub to rotate in a direction to collect the band.

36 Claims, 5 Drawing Figures

APPARATUS FOR WINDING OR UNWINDING WEBS OF PHOTOSENSITIVE MATERIAL OR THE LIKE

BACKGROUND OF THE INVENTION

The present invention relates to improvements in an apparatus for storing elongated webs of photographic material or the like, and more particularly to improvements in an apparatus for converting elongated webs, strips or tapes into rolls or vice versa. Still more particularly, the invention relates to improvements in an apparatus for convoluting a web, tape or strip (hereinafter called web for short) onto the core or hub of a bobbin or reel as well as for paying out the convoluted web.

It is already known to connect the hub of a bobbin or reel (hereinafter called reel) with one end portion of a flexible attaching element in the form of a band or cord the other end portion of which is secured to a clamping mechanism for the leader of a web. The hub is mounted on and is rotatable by a shaft which can be driven to convolute the attaching element (hereinafter called band for short) around the periphery of the hub and to thereupon convolute the web around the band provided that the leader of the web is properly engaged by the clamping mechanism. Reference may be had to German Offenlegungsschrift No. 1,663,465 wherein the aforementioned mechanism consists of a simple twin clamp or a clamping yoke into which the leader of the web (e.g., an exposed photographic film or an elongated strip of exposed photographic paper) is inserted by hand. Such relatively simple manually actuatable clamping mechanisms are satisfactory if they are accessible to the attendant or attendants. However, it happens quite frequently that the reel is or must be confined in the housing or casing of a cassette or an analogous receptacle for photosensitive material. In such instances, the band and the clamping mechanism are also confined in the housing so that the mechanism cannot be actuated (opened or closed) by hand. The same holds true when the reel is installed in certain types of processing machines, e.g., in certain photographic copying machines wherein a web of photographic paper and a web of photographic film must be transported past the copying station from a supply reel ahead to a takeup reel downstream of such station.

OBJECTS AND SUMMARY OF THE INVENTION

An object of the instant invention is to provide an apparatus which automatically threads the leader of a web of photographic film into the clamping mechanism so that the leader can be indirectly coupled to the attaching band even if the band and/or the clamping mechanism is not accessible to the attendants.

Another object of the invention is to provide an apparatus of the above outlined character with novel and improved means for separably coupling the leader of a web to the attaching band and with novel and improved threading means for confining the leader of an advancing web to movement into the range of the coupling means.

A further object of the invention is to provide the just mentioned threading means and the coupling means with novel and improved devices for invariably maintaining the coupling means in a position of readiness to engage the leader of a web when the coupling means is not in action, i.e., when such coupling means does not couple the leader of a web to the attaching band.

An additional object of the invention is to provide an apparatus of the above outlined character which can be used with equal advantage in the interior of a cassette or another receptacle (so that its coupling means is not accessible to attendants) as well as in regions where the reel, the coupling means as well as the attaching band are exposed and at least partially accessible to attendants.

A further object of the invention is to provide the improved apparatus with novel means for automatically disengaging the leader of a web from the coupling means in response to unwinding of the attaching band from the hub of the reel so that the web cannot be caused to break and/or to suffer other damage in response to transport in a direction to unwind the web and to advance the leader (actually the trailing end) of the unwound or paid-out web away from the reel.

Another object of the invention is to provide the apparatus with novel and improved means for facilitating ascertainment of the condition of the coupling means even if the coupling means is more or less permanently confined in the interior of a cassette or the like.

An additional object of the invention is to provide the apparatus with a novel and improved reel and with a novel and improved device for supporting and confining the clamping mechanism of the coupling means.

The invention resides in the provision of an apparatus for storing and/or paying out webs of flexible material (such as photographic films or photographic paper). The apparatus comprises a rotary reel having a hub, an elongated flexible attaching element in the form of a band, strip or cord one end of which is secured to the hub so that, when the reel is rotated in a first or a second direction, the attaching element is respectively wound onto or unwound from the hub, and a coupling unit which is secured to the other end portion of the attaching element and includes a clamping mechanism normally assuming an operative position in which the mechanism grips or is adapted to grip the leader of a web and thereby indirectly connects such leader to the attaching element to thereby ensure that the web is convoluted onto the hub and around the attaching element in response to further rotation of the reel in the first direction upon completed winding of the attaching element onto the hub. The clamping mechanism is movable to an inoperative position in which the leader of a web can be moved with reference to the coupling unit. The coupling unit assumes a first position when the attaching element is wound onto the hub to a first extent (e.g., when the attaching element is fully convoluted onto the hub and is confined in a complementary recess of the reel) and at least one second position when the attaching element is wound onto the hub to a different second extent (e.g., when the attaching element is fully unwound or when the attaching element is convoluted even further than in the first position of the coupling unit). The apparatus further comprises means for maintaining the clamping mechanism in the inoperative position in the second position of the coupling units.

The just mentioned maintaining means may include means for facilitating threading of the leader of a web into the range of the clamping mechanism in the second position of the coupling unit. For example, such means for facilitating the threading of the leader can include a system of idler rolls, rails or like parts which are inwardly adjacent to the inlet opening of a cassette or an analogous receptacle accommodating the reel, the attaching element and the coupling unit. The means for maintaining may further include means (e.g., at least one permanent magnet on the means for facilitating the threading and at least one ferromagnetic component on the coupling unit) for releasably holding the coupling unit in the second position, i.e., in that position in which the clamping mechanism is open and ready to engage the oncoming leader of a web. The coupling unit can be moved from the second to the first position against the opposition of the holding means in response to winding of the attaching element onto the hub. The drive means for rotating the reel at least in the first direction (to wind the attaching element onto the hub) may include a shaft which is surrounded by and transmits torque to the hub, at least in response to rotation of the shaft in the first direction.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
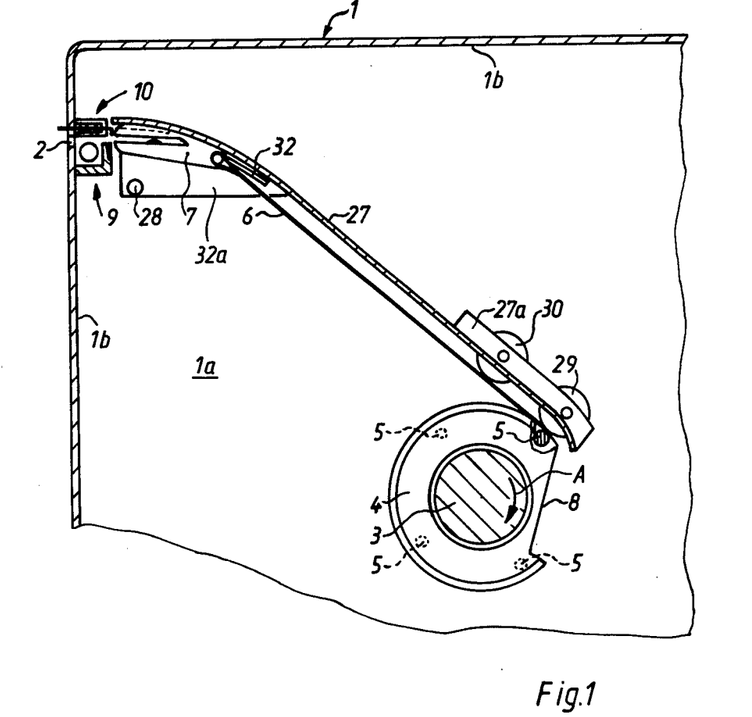
FIG. 1 is a fragmentary schematic central sectional view of the housing of a cassette for photographic film or paper and a schematic side elevational view of the improved apparatus whose coupling unit is shown in a position of readiness to accept the leader of a fresh web.

Referring first to FIG. 1, the reference character 1 denotes the housing or casing of a cassette or an analogous receptacle for a supply of convoluted photographic film or paper. The housing 1 includes two major panels 1a (only one shown) and several lateral walls 1b of which only two are illustrated in FIG. 1. One of the lateral walls 1b is formed with a slot-shaped inlet opening 2 which serves for admission of the leader 26a (see FIG. 2) of a web 26 of photographic film or paper.

The major panels 1a of the housing 1 rotatably support a drive shaft 3 which can be rotated in or counter to the direction indicated by the arrow A in order to collect a web 26 on or to pay out the web 26 from a reel or bobbin including a core or hub 4. The hub 4 surrounds and rotates with the drive shaft 3 (at least while the shaft 3 is driven in the direction of the arrow A) in the interior of the housing 1. The axial length of the hub 4, as considered at right angles to the plane of FIG. 1 or 2, equals or approximates the width of the web 26. The hub 4 comprises two spaced parallel annular flanges (see the flanges 37 in FIGS. 4 and 5) and a plurality of circumferentially spaced rod-shaped connecting members or rungs 5.

Figure 3:
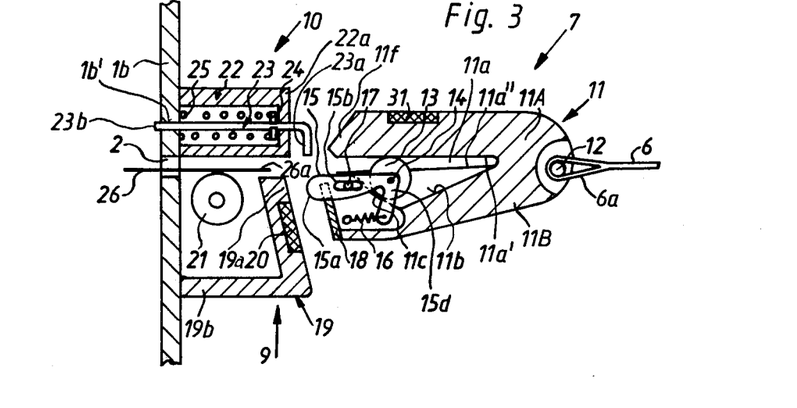
FIG. 3 is a greatly enlarged sectional view of the coupling and threading units in the apparatus of FIG. 1, with the clamping mechanism of the coupling unit shown in operative position.

One of the rungs 5 is connected to one end portion of a flexible attaching element 6 here shown as a tension band or cord having a length which equals or approximates the circumferential length of the flanges 37 of the hub 4. The other end portion 6a of the attaching element 6 is separably or permanently connected to the carrier or body 11 of a coupling unit 7 the details of which are shown in FIG. 3. In the illustrated embodiment, the other end portion 6a of the tension cord or band 6 has or is a closed loop or eyelet which is slipped onto a coupling pin 12 at the respective end of the carrier 11. The hub 4 is formed with a composite recess or socket 8 consisting of two axially aligned recesses or sockets machined into the peripheral portions of the flanges 37. This composite recess or socket 8 serves for reception of at least a portion of the coupling unit 7 when the attaching element 6 is convoluted around the hub 4. With reference to FIG. 1, the coupling unit 7 will enter the composite recess or socket 8 of the hub 4 in response to clockwise rotation (arrow A) of the drive shaft 3 through approximately 360°. The outline and depth of the composite recess or socket 8 are preferably such that the carrier 11 of the coupling unit 7 can be fully received within the confines of the hub. For example, the configuration of the carrier 11 can be such that it nearly or completely fills the composite recess 8 so that the combined outline of the hub 4 and carrier 11 is a circular cylinder having an axis which coincides with the axis of the drive shaft 3.

FIG. 1 illustrates the coupling unit 7 in a (second) position in which the unit 7 is adjacent to a threading unit 9 which, in turn, is immediately or closely adjacent to the inlet opening 2 of the respective lateral wall 1b of the housing 1. The interior of the housing 1 further confines an indicating device 10 which serves to indicate the position of the coupling unit 7 and the condition or position of a clamping mechanism in the unit 7. As best seen in FIG. 3, the indicating device 10 comprises a pin-shaped indicator 23 which is reciprocable in a tubular casing 22 attached to the inner side of that lateral wall 1b which is formed with the inlet opening 2. The indicator 23 carries a ring-shaped collar 24 which is biased in a direction away from the opening 2 by a helical spring 25 in the interior of the casing 22. The spring 25 reacts against the inner side of the lateral wall 1b and bears against the collar 24 so that the latter normally abuts against the end wall 22a of the casing 22. The right-hand end portion 23a of the indicator 23 is L-shaped and one of its legs extends into the path of leftward movement of the adjacent portion 11f of the carrier 11 of the coupling unit 7. When the coupling unit 7 assumes the position of FIG. 1, the portion 11f of the carrier 11 depresses the pin-shaped indicator 23 against the opposition of the spring 25 so that the left-hand end portion 23b of the indicator 23 emerges from the interior of the housing 1 and is readily visible adjacent to the outer end of the inlet opening 2. This indicates to the operator or operators that the coupling unit 7 is ready to receive the leader 26a of a fresh web 26 of photographic film or photographic paper or that the leader can be withdrawn from the aforementioned clamping mechanism.

FIG. 3 further shows additional details of the coupling unit 7. The carrier 11 of the coupling unit 7 is a substantially V-shaped body which is formed with a recess or slot 11a between two legs 11A and 11B. One (11a") of the surfaces 11a', 11a" which flank the recess 11a between the legs 11A, 11B is formed with a cutout or chamber 11b bounded in part by a concave cam face 11c for two roller followers 13 of which only one is shown in FIG. 3. The cam face 11c is inclined with reference to the surface 11a' in the recess 11a. The roller followers 13 normally bear against the surface 11a' as well as against the cam face 11c under the action of a yieldable biasing means here shown as a tension spring 16 which is anchored in the interior of the carrier 11 and is attached to one arm (15d) of a two-armed L-shaped lever 15. This lever constitutes a device for moving the clamping mechanism of the coupling unit 7 between operative and inoperative positions. The lever 15 is reciprocably fulcrumed on a pin 17 reciprocable in a elongated guide slot 15b in the longer second arm 15a of the lever 15. The slot 15b is parallel or nearly parallel to the surface 11a' and/or 11a". The junction of the arms 15a and 15d carries a pin 14 for the roller followers 13 which flank the respective portion of the lever 15. The extent to which the lever 15 is reciprocable with reference to the carrier 11, i.e., the extent to which the roller followers 13 can travel in the longitudinal direction of the surface 11a' in the interior of the carrier 11, is determined by the length of the slot 15b. The outermost part of the lever arm 15a constitutes a projection which extends to the left and beyond the carrier 11 so that it can strike against the adjacent leg 19a of a profiled arresting member 19 forming part of the threading unit 9. The other leg 19b of the arresting member 19 is affixed to the inner side of that lateral wall 1b which is provided with the inlet opening 2. The threading unit 9 further comprises a guide roll 21 which is an idler roll mounted within the confines on the legs 19a, 19b of the arresting member 19 adjacent to the inner end of the opening 2. When the leader 26a of the web 26 is introduced into the housing 1 by way of the opening 2, it slides tangentially along the peripheral surface of the guide roll 21 whereby the latter rotates clockwise, as viewed in FIG. 3, and the leader thereupon advances above the upper end face of the leg 19a toward and along the upper side of the lever arm 15a to move against the peripheral surfaces of the roller followers 13 and along the surface 11a' in the recess 11a between the legs 11A, 11B of the carrier 11. It will be noted that the parts 19a and 21 constitute a means for facilitating the threading of the leader 26a into the range of the clamping mechanism in the carrier 11. The just described introduction or threading of the leader 26a can take place when the roller followers 13 are spaced apart from the surface 11a' as a result of slight pivoting of the lever 15 in a clockwise direction, as viewed in FIG. 3. Such pivoting of the lever 15 can take place when the free end portion of the lever arm 15a bears against the adjacent side of the leg 19a of the arresting member 19 forming part of the threading unit 9. The tension spring 16 invariably tends to pivot the lever 15 in a clockwise direction, as viewed in FIG. 3, about the axis of the pin 17 which is fixedly secured to the leg 11B of the carrier 11. This carrier further supports one or two ferromagnetic plates 18 which are adjacent to the leg 19a of the arresting member 19 and the upper portions of which flank the free end portion of the lever arm 15a. The leg 19a constitutes or includes at least one permanent magnet 20 which is adjacent to the ferromagnetic plates 18 when the carrier 11 is held in the (second) position of FIG. 1. Thus, when the magnet 20 attracts the plates 18 (the attraction can result in actual contact with the magnet 20 but such actual contact is not critical), the free end portion or projection of the lever arm 15a abuts against the leg 19a with a force which is sufficient to move the slot 15b relative to the pin 17 so that the spring 16 is free to pivot the lever 15 clockwise and to thereby move the roller followers 13 away from the surface 11a'. The apparatus including the coupling unit 7 and the threading unit 9 is then ready for introduction of the leader 26a of a web 26 into the slot or recess 11a between the legs 11A, 11B of the carrier 11 or for withdrawal of the leader 26a from such slot. The parts 18, 20 can be said to constitute a means for releasably holding the clamping mechanism of the clamping unit 7 in the open or inoperative position in a given position of the unit 7 relative to the threading unit 9 and hub 4, namely, when the attaching element 6 is wound onto (or unwound from) the hub 4 to a predetermined extent. The hold of the parts 18, 20 upon the coupling unit 7 is terminated when the attaching element 6 is wound onto the hub 4, i.e., when the drive shaft 3 rotates in the direction of the arrow A. This results in movement of the coupling unit 7 from the aforementioned given position to another position on which the clamping mechanism is operative.

The spring 16 normally maintains the free end portion or projection of the lever arm 15a in the normal position. This projection is moved by the leg 19a (displacing means) of the unit 9 to a displaced or depressed position when the ferromagnetic plate or plates 18 are located in the field of the permanent magnet 20 so that the roller followers 13 are disengaged from the internal surface 11a', i.e., so that the clamping mechanism in the carrier 11 is inoperative.

Figure 2:
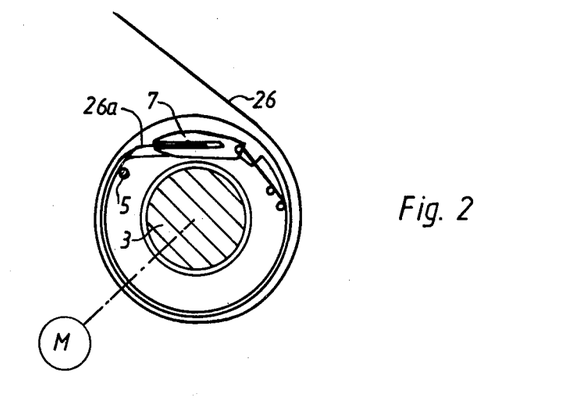
FIG. 2 is a sectional view of a portion of the apparatus shown in FIG. 1, with the coupling unit concealed in a recess of the reel.

The operation of the structure which is shown in FIGS. 1, 2 and 3 is as follows:

When the apparatus is idle, the ferromagnetic plates 18 of the coupling unit 7 are sufficiently remote from the permanent magnet 20 to ensure that the free end portion of the lever arm 15a is out of contact with the leg 19a or the arresting member 19 forming part of the threading unit 9. Consequently, the tension spring 16 maintains the roller followers 13 in the operative positions shown in FIG. 3 in which the roller followers are wedged between the surface 11a' and cam face 11c and bear against the surface 11a' with a reasonable force which suffices to properly clamp the leader 26a of a web against the leg 11A when the leader is located between the roller followers 13 and the surface 11a'.

It is assumed that the leader 26a of a web 26 is actually clamped between the surface 11a' and the peripheral surfaces of the roller followers 13. It is further assumed that the web 26 is drawn in a direction to the left, as viewed in FIG. 3, so that the carrier 11 of the coupling unit 7 approaches the opening 2. This results in the movement of ferromagnetic plates 18 into the range of the magnetic field of the permanent magnet 20. The magnet 20 attracts the plates 18 and causes the free end portion of the lever arm 15a to bear against the leg 19a or the threading unit 9. Therefore, the roller followers 13 can be pivoted by the tension spring 16 to move away from the surface 11a' whereby the leader 26a is released and can be extracted by way of the gap between the casing 22 of the indicating device 10 and the arresting member 19 of the threading unit 9. The permament magnet 20 continues to attract the ferromagnetic plates 18 so that the roller followers 13 remain out of contact with the surface 11a' in the slot 11a of the carrier 11. When the magnet 20 attracts the plates 18, the left-hand end portion of the slot 11a is in register with the gap between the casing 22 and arresting member 19, and hence in alignment with the inlet opening 2. As mentioned before, the guide slot 15b of the lever arm 15a enables the lever 15 to reciprocate with reference to the carrier 11. The lever 15 is shifted in the direction to the right, as viewed in FIG. 3, when the arm 15a strikes against the leg 19a whereby the spring 16 is free to contract so as to move the peripheral surfaces of the roller followers 13 away from the surface 11a' through a distance which at least equals but preferably at least slightly exceeds the thickness of the leader 26a of a web 26. This is the open or inoperative position of the clamping or gripping mechanism including the spring 16, the surface 11a' on the leg 11A and roller followers 13 in the interior of the carrier 11.

If an operator thereupon desires to introduce the leader 26a of a fresh web 26 into the interior of the housing 1, the leader 26a is pushed through the inlet opening 2 and along the periphery of the guide roll 21 in a direction toward and into the open end of the slot 11 between the legs 11A, 11B of the carrier 11. Since the spring 16 is free to contract, the roller followers 13 are remote from the surface 11a' and the leader 26a can advance beyond the roller followers 13 and all the way to the closed end of the slot 11a in the interior of the carrier 11. The operator knows that the coupling unit 7 is ready for reception of the leader 26a of a fresh web 26 because the left-hand end portion 23b of the pin-shaped indicator 23 forming part of the device 10 extends from the respective lateral wall 1b. Such end portion 23b can be provided with a flag or painted in a readily detectable color or a multitude of colors so that the operator or operators can immediately see whether or not the coupling unit 7 is in that position which corresponds to the inoperative or open position of the clamping mechanism including the roller followers 13. The lateral wall 1b which is formed with the opening 2 has a bore 1b' for the end portion 23b of the pin-shaped indicator 23 in the indicating unit 10.

Once the operator senses that the leader 26a has engaged the surface in the innermost portion of the slot 11a between the legs 11A, 11B or the carrier 11, he or she starts the prime mover M (see FIG. 2) which begins to rotate the shaft 3 in the (first) direction indicated by the arrow A. The hub 4 on the reel which surrounds the drive shaft 3 rotates in the same direction, and the attaching element 6 pulls the coupling unit 7 in a direction to the right, as viewed in FIG. 3, i.e., away from the threading unit 9. Consequently, the ferromagnetic plates 18 move away from the permanent magnet 20 and the spring 16 immediately pushes the free end portion of the lever arm 15a in a direction to the left, as viewed in FIG. 3, so that the roller followers 13 slide along the suitably inclined cam face 11c in the interior of the carrier 11 and clamp the leader 26a of the fresh web 26 against the internal surface 11a' with a force which suffices to ensure that, from there on, the web 26 shares the movements of the attaching element 6 in a direction substantially tangentially of the hub 4. It will be seen that starting of the prime mover M (this prime mover may constitute a simple electric motor) automatically entails a closing of the clamping mechanism in the interior of the carrier 11 so that the web 26 is compelled to enter the housing 1 of the cassette and to be convoluted around the hub 4 in response to further clockwise rotation of the drive shaft 3.

When the drive shaft 3 completes one revolution, or slightly less or slightly more than one revolution, the carrier 11 enters the composite recess or socket 8 on the hub 4 and the web 26 begins to form a series of successive convolutions around the flanges 37. Thus, the innermost convolution of the web 26 confines the flanges 37 as well as the carrier 11 of the coupling unit 7. The width of the clamping unit 7 is preferably less than the axial length of the hub 4 (see FIG. 5) so that the marginal portions of the convolutions of the web 26 can overlie the flanges 37 and form a neat package of accurately overlapping turns.

When the web 26 is to be withdrawn from the housing 1, the operation is reversed. In other words, the other leader of the convoluted web 26 is attached to a winding device, not shown, which pulls the web in a direction to the left, as viewed in FIG. 1 or 2, whereby the shaft 3 rotates in a counterclockwise direction, as viewed in FIG. 1 or 2, and the hub 4 pays out the web which issues via opening 2. When the last convolution of the web 26 is withdrawn from the interior of the housing 1, the carrier 11 of the coupling unit 7 is moved sufficiently close to the threading unit 9 to cause the ferromagnetic plates 18 to enter the field of the permanent magnet 20. Consequently, the free end portion of the lever arm 15a strikes against the leg 19a of the arresting member 19 and the spring 16 is free to move the roller followers 13 away from the internal surface 11a'. Therefore, the leader 26a of the web 26 can be extracted from the slot 11a and from the housing 1 by way of the opening 2. The permanent magnet 20 continues to attract the ferromagnetic plates 18 so that the coupling unit 7 remains in the position of FIG. 1 in which its clamping mechanism is open and ready for introduction of a fresh leader 26a into the slot 11a between the legs 11A, 11B of the carrier 11. It will be noted that the leader 26a of a web which was convoluted on the hub 4 need not be forcibly extracted from the interior of the carrier 11 because the clamping mechanism in the carrier 11 assumes its open or inoperative position not later than when the carrier 11 is sufficiently close to the threading unit 9 and inlet opening 2 to warrant opening of the clamping mechanism.

If the cassette which includes the housing 1 is relatively large and serves to accommodate a relatively wide web 26, the coupling unit 7 is likely to change its orientation during movement from the position of immediate proximity to the threading unit 9 and the position of confinement in the composite recess or socket 8 of the hub 4. In order to avoid such changes of orientation which could entail slight or pronounced twisting of the attaching element 6 about its longitudinal axis, the apparatus of FIGS. 1, 2 and 3 is preferably provided with suitable guiding means which can ensure that the orientation of the coupling unit 7 remains unchanged during travel between the composite recess 8 and the position of immediate proximity to the threading unit 9. In the embodiment of FIGS. 1, 2 and 3, the guiding means comprises an elongated arcuate guide rail or track 27 which consists of ferromagnetic material and is pivotable about a pivot member 28 which is adjacent to the threading unit 9 and is located at a level below the inlet opening 2. That end portion of the guide rail or track 27 which is adjacent to the hub 4 is provided with side walls or cheeks 27a for the shafts 29a, 30a of two rollers 29 and 30 which are freely rotatable with reference to the rail 27. The roller 29 rests by gravity on the flanges 37 of the hub 4 and/or on the innermost convolution or convolutions of the web 26 which is coiled around the flanges 37. The roller 29 is lifted off the adjacent convolution of the web 26 when the diameter of the convoluted web reaches and exceeds a threshold value, whereupon the outermost convolutions are engaged and tracked by the other roller 30 which is located at a level above the roller 29, i.e., the roller 30 is nearer to the inlet opening 2 than the roller 29.

As shown in FIG. 3, the exposed upper side of the leg 11A of the carrier 11 is provided with a small recessed permanent magnet 31 which can resemble a disc (see FIG. 5) and is adjacent to the inner side of the rail 27 when the carrier 11 of the coupling unit 7 is caused to move from the composite recess or socket 8 toward the inlet opening 2 or vice versa. The permanent magnet 31 then cooperates with the ferromagnetic rail 27 to ensure that the orientation of the carrier 11 remains unchanged, i.e., that the attaching element 6 is not subjected to deforming stresses of the type capable of changing the orientation of the coupling unit 7. The magnet 31 further cooperates with the rail 27 to reduce the weight of the mass (unit 7) which is attached to and suspended from the leader 26a of a web 26 while the web 26 is coupled to the element 6 by the unit 7. The force which the web 26 must overcome in order to pull the coupling unit 7 along the rail 27 in a direction from the recess 8 toward the threading unit 9 while the web is being extracted from the housing 1 is relatively small, i.e., the magnet 31 continues to adhere to but slides along the underside of the rail 27.

The guide rail 27 can be provided with additional or auxiliary side walls or cheeks 32 which are adjacent to the threading unit 9 and guide laterally extending follower portions 33 (see FIG. 5) of the carrier 11 to further reduce the likelihood of misorientation of the coupling unit 7 during movement along the rail 27. The cheeks 32 define with the rail 27 a channel wherein the follower portions 33 move while the coupling unit 7 advances from the hub 4 toward the opening 2 or vice versa. The shaft 28 is mounted in the two panels 1a of the housing 1 and extends through two relatively large cheeks 32a extending downwardly from the left-hand end portion of the rail 27, as viewed in FIG. 1.

The improved apparatus can be installed in the interior of a cassette or an analogous receptacle in a manner as shown in FIGS. 1 to 3. In such embodiment of the improved apparatus, the hub 4 of the reel for the convoluted web 26 cooperates with the flexible attaching element 6, with the coupling unit 7 and with the threading means 9 to ensure reliable and predictable introduction of the leader 26a of a fresh web into the carrier 11 as well as timely detachment of the leader 26a from the clamping mechanism in the carrier 11 when the web 26 is moved in a direction to be withdrawn from the housing 1.

However, the invention can be practiced with equal advantage in machines or systems wherein the reel whose hub or core carries a convoluted web must or should or can be removed from its drive shaft to be transferred into or onto another part of a machine, e.g., into another part of a machine for development of photographic films and/or prints in a processing laboratory. In other words, the housing 1 of the cassette shown in FIGS. 1 to 3 is not always a critical or important part of the apparatus, especially in such machines or systems where the convoluted web is to be transferred in convoluted condition rather than by withdrawing it through a slot-shaped or otherwise configurated opening of the confining means, such as the housing 1 of FIG. 1. Thus, it is often necessary or advisable that the reel including the hub 4, with a convoluted web 26 thereon, be transferred from the drive shaft 3 or another rotary driving member to a location where the threading unit 9 is lacking so that, once the web 26 is paid out, the coupling unit would be incapable of readily accepting the leader of a fresh web save by manually depressing the free end portion of the lever arm 15a in order to provide room for introduction of the leader 26a of such fresh web into the space between the roller follower 13 and the internal surface 11a' of the carrier 11. Furthermore, many cassettes for photographic film or photographic paper are designed in such a way that the convoluted web can be withdrawn from their interior upon partial removal of the housing or upon opening of a suitable door which affords access to the interior of the cassette. The removed convoluted web (with the hub 4) is then introduced into another portion of a machine or a series of machines in a processing laboratory or an analogous institution, namely, into a portion which does not exhibit a threading unit 9 with means (permanent magnet 20 or the like) for automatically opening the clamping mechanism in the interior of the coupling unit 7 and for holding the clamping mechanism in the open or inoperative position. In such situations, it is advisable to provide means for opening the clamping mechanism of the coupling unit 7 in spite of the absence of a threading unit 9 and its magnet 20, for example, in order to allow for extraction of the leader 26a from the carrier 11 at a locus which is remote from the nearest threading unit 9. Such arrangement is illustrated in FIGS. 4 and 5 wherein all such parts which are identical with or clearly analogous to corresponding parts of the apparatus of FIGS. 1 to 3 are denoted by similar reference characters.

Figure 4:
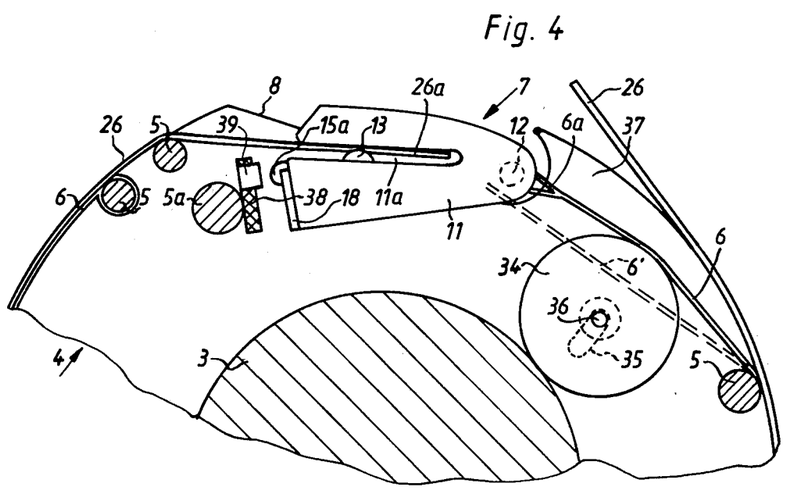
FIG. 4 is a fragmentary partly side elevational and partly sectional view of a portion of a modified apparatus wherein a means for holding the clamping mechanism in inoperative position is provided on the reel.

FIG. 4 shows the coupling unit 7 in the interior of the recess 8 which is defined by the hub 4 of the reel on the drive shaft 3. The shaft 3 is not confined in a housing or another receptacle, and one of its end portions is or can be exposed so that the hub 4 can be slipped onto or off the shaft. Of course, it is also possible to install the shaft 3 in the housing of a cassette which can be opened or sufficiently dismantled to allow for removal of the hub 4 (with a convoluted web 26 thereon) from the shaft 3 in open or partly dismantled condition of the housing. The leader 26a of the web 26 is attached to the carrier 11 of the coupling unit 7 in the recess 8, i.e., the clamping mechanism (including the roller followers 13) in the carrier 11 is operative and urges the leader 26a of the web 26 against a portion of the carrier. The innermost convolution of the convoluted web 26 surrounds the flexible attaching element 6 which directly surrounds a portion of the hub 4 within the confines of the innermost convolution of the web. One end portion of the attaching element 6 is secured to one of the rungs 5 and the other end portion 6a of the element 6 is connected to the pin 12 at that end of the carrier 11 which is remote from the open end of the slot 11a. The attaching element 6 engages a tensioning roll 34 which abuts against the external surface of the shaft 3 and is radially movably installed in the flanges 37 of the hub 4. The tensioning roll 34 has two stub shafts 36 which extend into elongated slot-shaped recesses 35 of the flanges 37. The recesses extend substantially radially of the shaft 3. The diameter and mounting of the cylindrical central portion (see FIG. 5) of the tensioning roll 34 are selected in such a way that the stub shafts 36 are located in the radially outermost portions of the respective slots 35 when the peripheral surface of the tensioning roll 34 contacts the peripheral surface of the drive shaft 3. Also, the tensioning roll 34 then engages and deflects an intermediate portion of the flexible attaching element 6 so that the latter assumes an arcuate shape (shown in FIG. 4 by solid lines) rather than a shape (indicated at 6') which is shown in FIG. 4 by broken lines. In other words, the carrier 11 of the coupling unit 7 is slightly closer to the last rung 5 which is engaged by the convoluted attaching element 6 than in the absence of the tensioning roll 34. The extent to which the cylindrical central portion of the tensioning roll 34 moves the corresponding portion of the attaching element 6 from the position 6' is within the range of a few millimeters.

The flanges 37 of the hub 4 further support a crosshead 5a which is a rod-shaped member with end portions anchored in the respective flanges 37 adjacent to the recess 8 and which carries one or more permanent magnets 38 as well as one or more displacing members or stops 39. FIG. 5 shows that the crosshead 5a can support two spaced apart rod-shaped (cylindrical) permanent magnets 38 and a single stop 39 therebetween. The stop 39 and the permanent magnets 38 are located at a preselected distance from the ferromagnetic plate or plates 18 on the adjacent end portion of the carrier 11 which forms part of the coupling unit 7. Such distance slightly exceeds the length of that (end) portion of the lever arm 15a which extends from the carrier 11, i.e., the tensioning roll 34 ensures that the clamping mechanism in the interior of the carrier 11 is held in the operative position because the cylindrical central portion of the roll 34 does not permit further leftward movement of the carrier 11, as viewed in FIG. 4.

Figure 5:
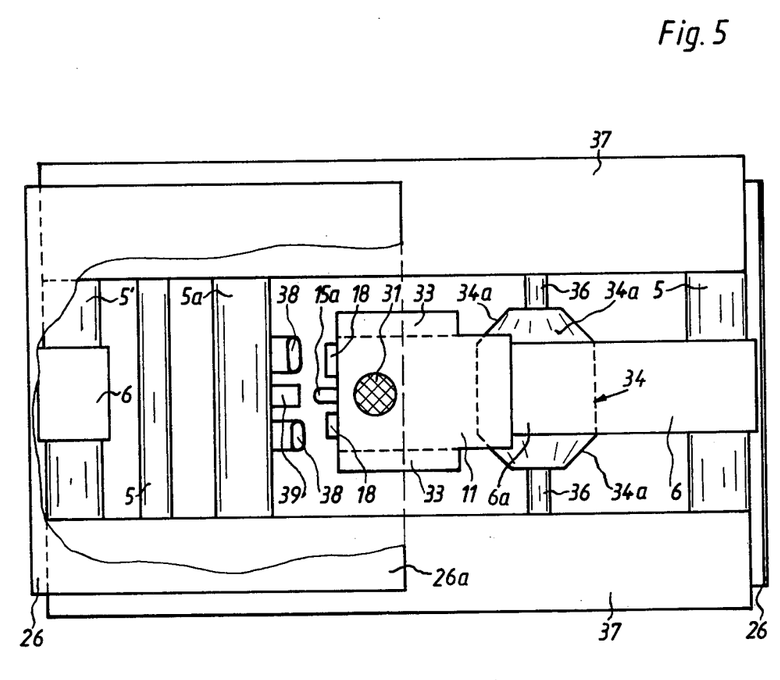
FIG. 5 is a plan view of the structure which is shown in FIG. 4.

When the web 26 is fully convoluted on the hub 4 of the apparatus shown in FIGS. 4 and 5, the hub 4 is slipped axially along and off the drive shaft 3 so that the stub shafts 36 of the tensioning roll 34 can move radially inwardly because the peripheral surface of the shaft 3 does not prevent further movement of the cylindrical central portion of the tensioning roll toward the axis of the hub 4. Consequently, the magnetic field of the permanent magnets 38 can attract the ferromagnetic plates 18 of the carrier 11 and the end portion or projection of the lever arm 15a strikes against the displacing means or stop 39 to thereby open the clamping mechanism in the interior of the carrier 11. This is due to the fact that the flexible attaching element 6 is then free to move from the solid-line position to the broken-line position 6' of FIG. 4, and such movement of the attaching element 6 suffices to enable the stop 39 to depress the lever arm 15a to the extent which is needed to open the clamping mechanism in the interior of the carrier 11.

It will be noted that the provision of the crosshead 5a (and more particularly of permanent magnets 38 and stop 39 on the crosshead 5a) renders it possible to automatically open the clamping mechanism of the coupling unit 7 as soon as the hub 4 is slipped off the drive shaft 3. Therefore, the convoluted web 26 can be removed from the hub 4 and the leader 26a of such web can be withdrawn from the interior of the carrier 11 as soon as the last convolution of the web is unwound. However, once the hub 4 is slipped back onto the drive shaft 3, the tensioning roll 34 automatically reduces the effective length of the flexible attaching element 6 so that the latter does not permit the ferromagnetic plates 18 on the carrier 11 to move into the range of the permanent magnets 38 on the crosshead 5a to such an extent that the stop 39 could maintain the lever 15 in that position which is needed to maintain the clamping mechanism of the coupling unit 7 in open or inoperative position.

It will be readily appreciated that the structure which is shown in FIGS. 4 and 5 can be used with equal advantage on shafts or like components which are provided with suitable grooves for the tensioning roll 34 so that the latter can move to its radially innermost position and does not interfere with engagement between the lever arm 15a and the stop 39. Moreover, the shaft 3 can be replaced with one or two short stubs which do not reach the cylindrical central portion of the tensioning roll 34 and, consequently, such stubs cannot cause the tensioning roll to assume the operative position of FIG. 4. This means that the stop 39 automatically opens the clamping mechanism in the carrier 11 even if the hub 4 is slipped onto a shaft or a device resembling or performing one or more functions of the drive shaft 3, as long as such device does not maintain the tensioning roll 34 in the operative position of FIG. 4. In order to reduce the effort which must be exerted to slip the hub 4 onto the shaft 3 or an analogous device, the cylindrical central portion of the tensioning roll 34 is flanked by two conical portions 34a which taper in directions toward the exposed portions of the respective stub shafts 36. It is clear that a single tapering conical or analogous portion 36a suffices if the hub 4 is invariably slipped onto the shaft 3 in a given direction, e.g., upwardly, as viewed in FIG. 5.

The threading unit 9 (and the parts 18, 38, 39 shown in FIGS. 4 and 5) can be said to constitute a means for maintaining the clamping mechanism (including the roller followers 13) of the coupling unit 7 in the open or inoperative position in a given position of the clamping unit 7. Such given position is the position which is shown in FIG. 1 (where the lever arm 15a abuts against and is depressed by the leg 19a of the arresting member 19) or the position which the coupling unit 7 of FIG. 4 would assume if the carrier 11 were permitted to move further to the left, i.e., if the attaching element 6 were permitted to assume the position 6' of FIG. 4. Otherwise stated, the clamping unit 7 of FIGS. 1 to 3 can be moved between a first position (namely, the position of FIG. 2) in which the clamping mechanism is invariably operative and in which the attaching element 6 is wound onto the hub 4 to a first extent (in FIG. 2, the entire attaching element 6 is convoluted onto the hub 4), and the coupling unit 7 is further movable to at least one second position (such as the position of FIG. 1) in which the clamping mechanism including the roller followers 13 is maintained in the open or inoperative position because the attaching element 6 is convoluted onto the hub 4 to a different second extent (in FIG. 1, the attaching element 6 is completely or nearly completely unwound from the hub 4). In the apparatus of FIGS. 4 and 5, the first position of the coupling mechanism 7 is shown in FIG. 4 (the clamping mechanism in the carrier 11 is maintained in the operative position because the attaching element 6 is wound onto the hub 4 to a first extent, namely, to the extent permitted by the cylindrical central portion of the tensioning roll 34). The second position of the coupling unit 7 of FIGS. 4 and 5 is not shown in the drawing. As mentioned above, the unit 7 assumes such second position when the attaching element 6 is wound onto the core or hub 4 to a different second extent, namely, when the hub 4 is slipped off the drive shaft 3 so that the attaching element 6 can assume the broken-line position 6′ and the parts 18, 38, 39 cooperate to maintain the clamping mechanism of the coupling unit 7 in the inoperative or open position so that the leader 26a of a web 26 can be inserted into or withdrawn from the slot 11a of the carrier 11.

The opening means 18, 38, 39 of FIGS. 4 and 5 can be provided in addition to the combined opening means and threading unit 9 of the apparatus which is shown in FIGS. 1 to 3. The clamping mechanism of the coupling unit 7 normally assumes its operative or closed position, i.e., this mechanism opens or becomes inoperative only in certain positions of the respective carrier 11, namely, when the carrier 11 is sufficiently close to the threading unit 9 or when the carrier 11 is sufficiently close to the crosshead 5a.

If desired, the tensioning roll 34 of FIGS. 4 and 5 can be replaced by a linkage or any other suitable means which deforms the convoluted attaching element 6 when the hub 4 supporting the crosshead 5a and the parts 38, 39 thereon is slipped onto the shaft 3 so that the attaching element 6 moves from the position 6′ to the solid-line position of FIG. 4 and thereby removes or withdraws the ferromagnetic plates 18 from the field of the permanent magnet or magnets 38.

An important advantage of the improved apparatus is that the clamping mechanism in the carrier 11 of the coupling unit 7 reliably engages and holds the leader 26a of a web 26 without any assistance from the attendant or attendants. Thus, even the threading of the leader 26a through the opening 2 or directly into the slot 11a of the carrier 11 can be performed by a suitable machine or apparatus so that the attendants need not touch the web 26 at all.

Another advantage of the improved apparatus is that a very short leader (26a) of a web suffices to ensure adequate anchoring of the leader in the clamping unit 7. Thus, losses of material of the web (or losses due to unused portions of the web) are negligible because that portion (leader) of the web which cannot be utilized as a result of clamping in the unit 7 is very short.

A further important advantage of the improved apparatus is that it enhances the versatility of the cassette in which the apparatus is installed or of the machine or machine part which can accept the hub 4. This will be readily appreciated since the position of the inlet opening in the cassette can be selected practically at will, the same as the length of the flexible attaching element 6, the axial length of the hub 5 (to receive relatively wide or relatively narrow webs), and/or the position of the threading unit 9 with reference to the shaft 3 can be selected practically at will.

The auxiliary opening means of FIGS. 4 and 5 exhibits the advantage that the improved apparatus can be used in connection with or in machines which are not equipped with the threading unit 9 or an equivalent unit. As mentioned above, the auxiliary opening means of FIGS. 4 and 5 (namely, the magnets 38, the stop 39 and the tensioning roll 34) render it possible to open the clamping mechanism in the carrier 11 irrespective of the presence or absence of the threading unit 9 by the simple expedient of slipping the hub 4 off the shaft 3 or by mounting the hub 4 on a shaft or a like device which does not cause the tensioning roll 34 to maintain the flexible attaching element 6 in the solid-line position of FIG. 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for storing and paying out webs of flexible material, such as photographic film or photographic paper, comprising a rotary reel having a hub; an elongated flexible attaching element having a first portion secured to said hub and a second portion, said reel being rotatable in first and second directions to respectively wind said element onto and to permit unwinding of said element from said hub; a coupling unit secured to said second portion of said element and including a clamping mechanism normally assuming an operative position in which said mechanism grips or is adapted to grip the leader of a web and thereby connects the gripped leader to said element to ensure that the web is convoluted onto said hub in response to further rotation of said reel in said first direction upon completed winding of said element onto said hub, said mechanism being movable to an inoperative position in which the leader of a web can be moved with reference to said unit, said unit assuming a first position when said element is wound onto said hub to a first extent and at least one second position when said element is wound onto said hub to a different second extent; and means for maintaining said mechanism in said inoperative position in the one second position of said unit.

2. The apparatus of claim 1, wherein said reel has a recess for said coupling unit, said unit being disposed in said recess in said first position thereof.

3. The apparatus of claim 1, wherein said means for maintaining includes means for facilitating the threading of the leader of a web into the range of said clamping mechanism in the second position of said coupling unit.

4. The apparatus of claim 1, further comprising means for rotating said reel in said first direction, said rotating means including a shaft and said hub surrounding and sharing the angular movements of said shaft in said first direction.

5. The apparatus of claim 1, wherein said means for maintaining includes means for releasably holding said coupling unit in said first position.

6. The apparatus of claim 5, wherein said coupling unit is movable from said second to said first position against the opposition of said holding means in response to winding of said attaching element onto said hub, and further comprising drive means for rotating said reel in said first direction.

7. The apparatus of claim 1, further comprising means for releasably holding said coupling unit in said second position, said holding means including magnet means provided on said means for maintaining said mechanism in inoperative position.

8. The apparatus of claim 7, wherein said holding means further comprises at least one ferromagnetic member located in the field of said magnet in the second position of said coupling unit.

9. The apparatus of claim 1, wherein said coupling unit further includes carrier means for said mechanism and a device for moving said mechanism between operative and inoperative positions, said device including a projection movable with reference to said carrier means between normal and displaced positions and arranged to move said mechanism from said operative to said inoperative position in response to movement from said normal to said displaced position, said means for maintaining including displacing means arranged to move said projection to said displaced position in response to movement of said coupling unit to said second position.

10. The apparatus of claim 9, wherein said device is a lever pivotable relative to said carrier means and having an arm which includes said projection.

11. The apparatus of claim 10, wherein said mechanism includes at least one follower mounted on said lever, a surface provided on said carrier means, and means for yieldably biasing said follower against said surface, said arm maintaining said follower away from said surface in the displaced position thereof so that the leader of a web can be inserted between said follower and said surface.

12. The apparatus of claim 11, wherein said lever is substantially L-shaped and includes means for rotatably supporting said follower.

13. The apparatus of claim 11, wherein said carrier means has a cam face against which said follower is urged by said biasing means and which is tracked by said follower during movement toward and away from said surface.

14. The apparatus of claim 11, wherein said carrier means has a slot for introduction and retraction of the leader of a web, said surface flanking at least a portion of said slot.

15. The apparatus of claim 14, wherein said lever has an elongated slot and further comprising a pin-shaped pivot member in the slot of said lever, said pivot member enabling said lever to turn as well as to reciprocate with reference to said carrier means.

16. The apparatus of claim 15, wherein said follower is a roller and said carrier means has a chamber for said roller and a cam face flanking a portion of said chamber, said biasing means urging said roller against said cam face and said roller tracking said cam face during movement between said normal and displaced positions thereof.

17. The apparatus of claim 11, further comprising means for reciprocably and turnably mounting said lever in said carrier means.

18. The apparatus of claim 17, wherein said mounting means comprises an elongated slot provided in said lever and being substantially parallel to said surface of said carrier means.

19. The apparatus of claim 1, further comprising means for indicating the position of said clamping mechanism.

20. The apparatus of claim 1, further comprising means for guiding said coupling unit during movement between said first and second positions.

21. The apparatus of claim 20, wherein said guiding means includes an elongated ferromagnetic member adjacent the path of movement of said unit between said first and second positions and permanent magnet means provided on said unit and cooperating with said member to retain said unit in said path.

22. The apparatus of claim 21, wherein said means for maintaining is remote from said hub and said member extends substantially between said hub and said means for maintaining, and further comprising pivot means provided for said member in the region of said means for maintaining.

23. The apparatus of claim 22, further comprising at least one rotary element provided on said member and contacting said hub in the unwound condition of said attaching element, said rotary element contacting the convoluted web when such web surrounds the attaching element on said hub.

24. The apparatus of claim 21, wherein said member has at least one wall and said coupling unit further includes follower means tracking said wall at least during a portion of movement of said unit between said first and second positions.

25. The apparatus of claim 24, wherein said member has several walls defining a channel for said follower means.

26. The apparatus of claim 1, wherein said means for maintaining is mounted on said hub.

27. The apparatus of claim 26, wherein said hub has a recess into which said unit extends in at least one of said positions thereof, said means for maintaining being disposed in the region of said recess.

28. The apparatus of claim 27, wherein said attaching element is at least substantially completely wound onto said hub in said one second position of said unit.

29. The apparatus of claim 26, wherein said means for maintaining includes means for magnetically attracting said unit to said one second position and means for actuating said mechanism while said attracting means holds the coupling unit in said one second position so that the actuated mechanism assumes its inoperative position.

30. The apparatus of claim 26, wherein said hub includes at least one flange and said flange has a radially extending slot, and further comprising a tensioning member having a portion extending into and being reciprocable in said slot, and drive means for rotating said hub at least in said first direction, said drive means including a shaft which is surrounded by said hub and said hub being movable axially onto and off said shaft, said tensioning member having a peripheral surface contacting said shaft when said hub surrounds said shaft whereby said tensioning member maintains the coupling unit in said second position by way of the attaching element when the latter is wound onto said tensioning member.

31. The apparatus of claim 30, wherein said portion of said tensioning member is remote from the radially innermost portion of said slot when said hub surrounds said shaft, said tensioning member being movable radially inwardly of said hub when the latter is slipped off said shaft.

32. The apparatus of claim 31, wherein said means for maintaining includes means for attracting said coupling unit to said second position.

33. The apparatus of claim 31, wherein said tensioning member includes a roller and said roller has a peripheral surface which abuts against the peripheral surface of said shaft when the latter is surrounded by said hub, the peripheral surface of said roller maintaining said attaching element in a predetermined position corresponding to the winding of such element to said second extent when said element is wound around said hub and the latter surrounds said shaft.

34. The apparatus of claim 33, wherein said means for maintaining is arranged to effect the winding of said attaching element to said first extent in response to slipping of said hub axially off and away from said shaft.

35. The apparatus of claim 30, wherein said tensioning member is a roller having a cylindrical portion which is surrounded by said attaching element when the latter is wound onto said hub and a conical portion which tapers in a direction from said cylindrical portion toward that portion of said tensioning member which extends into said slot.

36. The apparatus of claim 30, wherein said tensioning member includes a cylindrical central portion, two conical portions which flank and taper in directions away from said central portion, and two stub shafts extending axially of and away from said conical portions, one of said stub shafts constituting said portion which extends into said slot and said hub having a second flange with a second slot which is aligned with said first mentioned slot and receives a portion of the other of said stub shafts.

* * * * *